(12) United States Patent
Sawado et al.

(10) Patent No.: US 12,423,053 B2
(45) Date of Patent: Sep. 23, 2025

(54) INFORMATION PROCESSING APPARATUS, INFORMATION PROCESSING SYSTEM, NON-TRANSITORY COMPUTER READABLE MEDIUM, AND INFORMATION PROCESSING METHOD

(71) Applicant: TOYOTA JIDOSHA KABUSHIKI KAISHA, Toyota (JP)

(72) Inventors: Aiko Sawado, Setagaya-ku (JP); Daisuke Kikuchi, Yokohama (JP); Wataru Kaku, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 18/464,482

(22) Filed: Sep. 11, 2023

(65) Prior Publication Data
US 2024/0094980 A1 Mar. 21, 2024

(30) Foreign Application Priority Data

Sep. 21, 2022 (JP) ................................ 2022-150751

(51) Int. Cl.
| | |
|---|---|
| *G06F 3/16* | (2006.01) |
| *G06F 3/01* | (2006.01) |
| *G09B 5/14* | (2006.01) |
| *H04L 12/18* | (2006.01) |
| *H04L 65/1089* | (2022.01) |

(52) U.S. Cl.
CPC .............. *G06F 3/165* (2013.01); *G06F 3/013* (2013.01); *G06F 3/167* (2013.01); *G09B 5/14* (2013.01); *H04L 12/1831* (2013.01); *H04L 65/1089* (2013.01)

(58) Field of Classification Search
CPC . G06F 3/165; G06F 3/167; G06F 3/16; G09B 5/14; H04L 12/1831; H04L 65/1089
See application file for complete search history.

(56) References Cited

U.S. PATENT DOCUMENTS

| | | | |
|---|---|---|---|
| 2012/0147123 A1* | 6/2012 | Lian | H04N 7/15 |
| | | | 348/E7.083 |
| 2022/0141266 A1* | 5/2022 | Cossar | G06Q 10/1095 |
| | | | 348/14.04 |

FOREIGN PATENT DOCUMENTS

| | | |
|---|---|---|
| GB | 2 325 774 A | 12/1998 |
| JP | H10-333538 A | 12/1998 |

(Continued)

*Primary Examiner* — Olisa Anwah
(74) *Attorney, Agent, or Firm* — Oliff PLC

(57) ABSTRACT

An information processing apparatus supports dialogue using dialogue apparatuses used by a plurality of users located remotely from each other. The information processing apparatus includes a controller configured to estimate, during execution of a remote dialogue, a parameter of each interlocutor with respect to a topic of the remote dialogue based on a video of each interlocutor, display an alert, on a first dialogue apparatus of a first user, indicating each interlocutor whose estimated parameter is less than a threshold, and when the first user gazes at and speaks to an interlocutor displayed with the alert among a plurality of interlocutors as second users displayed on a screen of the first dialogue apparatus, transmit first audio data with a high volume to a second dialogue apparatus of the interlocutor and transmit second audio data with a low volume to second dialogue apparatus of interlocutors other than the interlocutor.

7 Claims, 6 Drawing Sheets

(56) References Cited

FOREIGN PATENT DOCUMENTS

| JP | 2009-267621 | A |   | 11/2009 |
|----|-------------|---|---|---------|
| JP | 2015-069136 | A |   | 4/2015  |
| JP | 2015046822  | A | * | 6/2015  |
| JP | 2016-213631 | A |   | 12/2016 |
| JP | 2022098825  | A | * | 2/2022  |

* cited by examiner

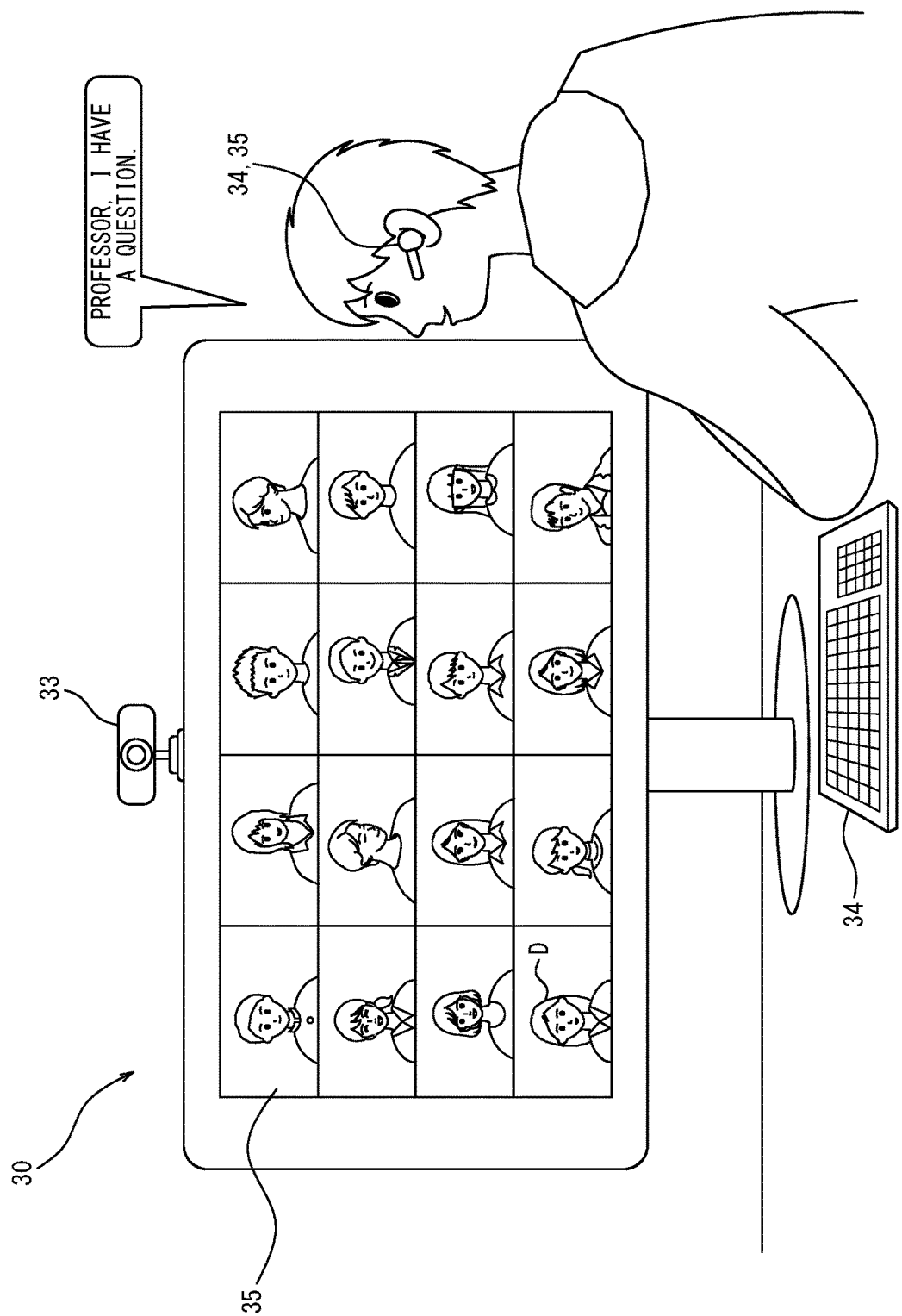

INFORMATION PROCESSING APPARATUS, INFORMATION PROCESSING SYSTEM, NON-TRANSITORY COMPUTER READABLE MEDIUM, AND INFORMATION PROCESSING METHOD

CROSS-REFERENCE TO RELATED APPLICATION

This application claims priority to Japanese Patent Application No. 2022-150751 filed on Sep. 21, 2022, the entire contents of which are incorporated herein by reference.

TECHNICAL FIELD

The present disclosure relates to an information processing apparatus, an information processing system, a program, and an information processing method.

BACKGROUND

Technology for supporting dialogue using a dialogue apparatus used by each of a plurality of users located remotely from each other is known. For example, Patent Literature (PTL) 1 discloses a communication apparatus that can make it easier for listeners to recognize whether they understand the content of a meeting or the like during a teleconference or other form of communication among a plurality of communication terminals.

CITATION LIST

Patent Literature

PTL 1: JP 2009-267621 A

SUMMARY

However, in the conventional technology described in PTL 1, when a user wants to address a predetermined user as a dialogue partner, the addressing voice is outputted to other users at the same volume as to the predetermined user. Therefore, the addressing voice might not reach the predetermined user. The convenience of a dialogue service using a dialogue apparatus used by each of a plurality of users located remotely from each other is consequently reduced.

It would be helpful to provide an information processing apparatus, an information processing system, a program, and an information processing method that improve the convenience of a dialogue service using a dialogue apparatus used by each of a plurality of users located remotely from each other.

An information processing apparatus according to an embodiment of the present disclosure is for supporting a dialogue using a dialogue apparatus used by each of a plurality of users located remotely from each other, the information processing apparatus including a controller configured to:

estimate, during execution of a remote dialogue, a parameter of each interlocutor with respect to a topic of the remote dialogue based on a video of each interlocutor, display an alert, on the dialogue apparatus of a first user, indicating each interlocutor whose estimated parameter is less than a threshold, and when the first user gazes at and speaks to an interlocutor displayed with the alert among a plurality of interlocutors as second users displayed on a screen of the dialogue apparatus, transmit first audio data with a high volume to the dialogue apparatus of the interlocutor and transmit second audio data with a low volume to the dialogue apparatus of interlocutors other than the interlocutor.

A program according to an embodiment of the present disclosure is configured to cause an information processing apparatus for supporting a dialogue using a dialogue apparatus used by each of a plurality of users located remotely from each other to execute operations, the operations including:

estimating, during execution of a remote dialogue, a parameter of each interlocutor with respect to a topic of the remote dialogue based on a video of each interlocutor, displaying an alert, on the dialogue apparatus of a first user, indicating each interlocutor whose estimated parameter is less than a threshold, and when the first user gazes at and speaks to an interlocutor displayed with the alert among a plurality of interlocutors as second users displayed on a screen of the dialogue apparatus, transmitting first audio data with a high volume to the dialogue apparatus of the interlocutor and transmitting second audio data with a low volume to the dialogue apparatus of interlocutors other than the interlocutor.

An information processing method according to an embodiment of the present disclosure is for supporting a dialogue using a dialogue apparatus used by each of a plurality of users located remotely from each other, the information processing method including:

estimating, during execution of a remote dialogue, a parameter of each interlocutor with respect to a topic of the remote dialogue based on a video of each interlocutor, displaying an alert, on the dialogue apparatus of a first user, indicating each interlocutor whose estimated parameter is less than a threshold, and when the first user gazes at and speaks to an interlocutor displayed with the alert among a plurality of interlocutors as second users displayed on a screen of the dialogue apparatus, transmitting first audio data with a high volume to the dialogue apparatus of the interlocutor and transmitting second audio data with a low volume to the dialogue apparatus of interlocutors other than the interlocutor.

According to the information processing apparatus, the information processing system, the program, and the information processing method of the present disclosure, the convenience of a dialogue service using a dialogue apparatus used by each of a plurality of users located remotely from each other is improved.

BRIEF DESCRIPTION OF THE DRAWINGS

In the accompanying drawings:

FIG. 6 is a schematic diagram illustrating an example of video displayed on the screen of an output interface of the second dialogue apparatus of a second user.

DETAILED DESCRIPTION

An embodiment of the present disclosure will be described below, with reference to the drawings.

Figure 1:
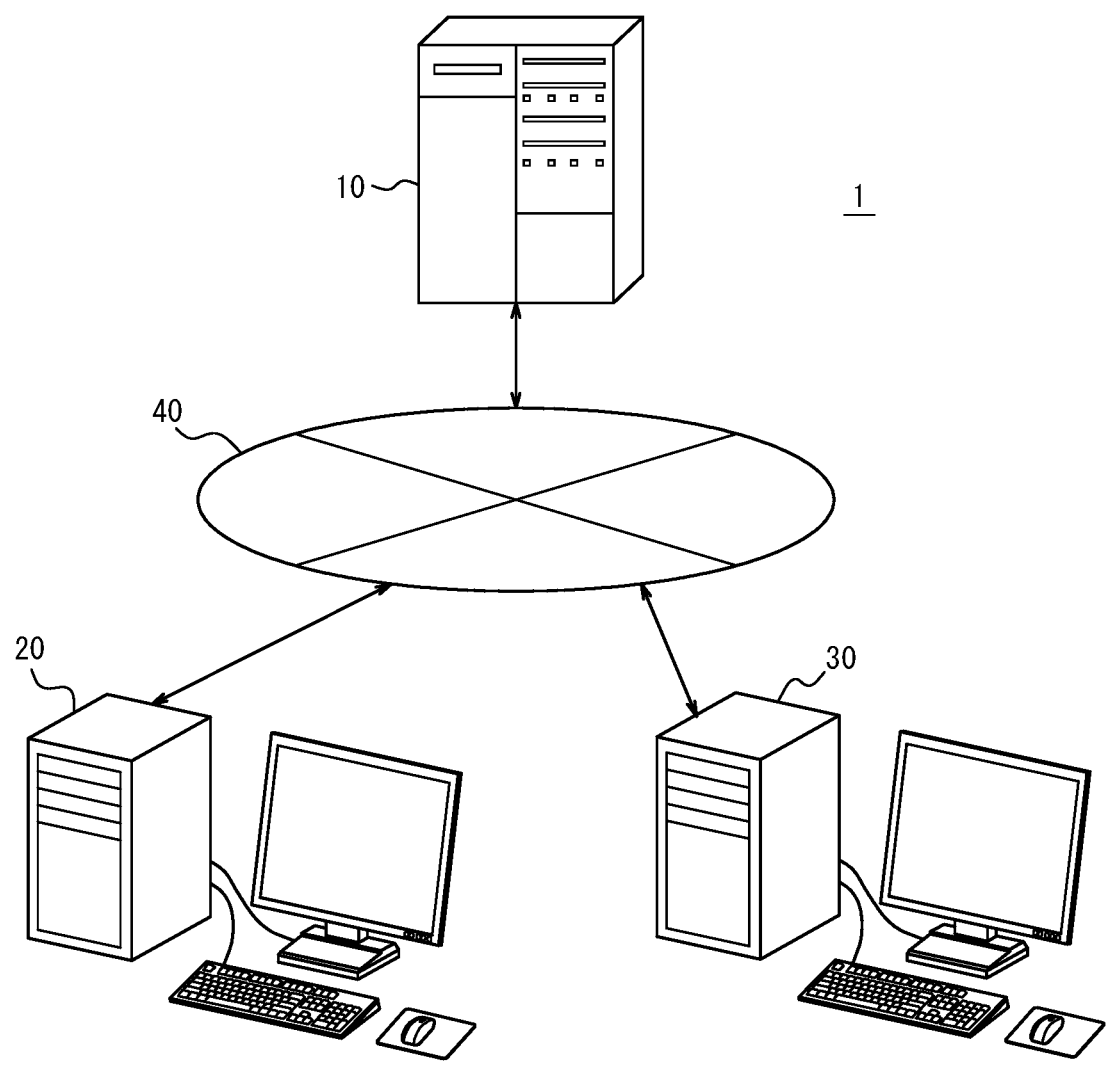
FIG. 1 is a configuration diagram illustrating a configuration of an information processing system that includes an information processing apparatus according to an embodiment of the present disclosure.

FIG. 1 is a configuration diagram illustrating a configuration of an information processing system 1 that includes an information processing apparatus 10 according to an embodiment of the present disclosure. Referring to FIG. 1, an outline of the information processing system 1 that includes the information processing apparatus 10 according to the embodiment of the present disclosure will be primarily described. In addition to the information processing apparatus 10, the information processing system 1 includes one first dialogue apparatus 20 and a plurality of second dialogue apparatuses 30.

Although only one second dialogue apparatus 30 is depicted in FIG. 1 for the sake of explanation, the number of second dialogue apparatuses 30 included in the information processing system 1 is two or more. In FIG. 1, only one information processing apparatus 10 is depicted for the sake of explanation, but the number of information processing apparatuses 10 included in the information processing system 1 may be two or more. Each of the information processing apparatus 10, the one first dialogue apparatus 20, and the plurality of second dialogue apparatuses 30 is communicably connected to a network 40 including, for example, a mobile communication network and/or the Internet.

As an overview of an embodiment, the information processing apparatus 10 supports dialogue using a dialogue apparatus used by each of a plurality of users located remotely from each other. In the present disclosure, the "dialogue apparatuses" include the first dialogue apparatus 20 and the second dialogue apparatuses 30.

During the execution of a remote dialogue, the information processing apparatus 10 estimates a parameter for each interlocutor with respect to the topic of the remote dialogue based on a video of each interlocutor. In the present disclosure, the "topic" includes, for example, the subject matter being explained in class. The "parameter" includes, for example, at least one of a level of comprehension, a level of interest, and a level of concentration. The information processing apparatus 10 displays an alert, on the dialogue apparatus of a first user, indicating each interlocutor whose estimated parameter is less than a threshold.

When the first user gazes at and speaks to an interlocutor displayed with the alert among a plurality of interlocutors as second users displayed on the screen of the dialogue apparatus, the information processing apparatus 10 transmits first audio data with a high volume to the dialogue apparatus of the interlocutor. The information processing apparatus 10 transmits second audio data with a low volume to the dialogue apparatus of interlocutors other than the interlocutor.

In the present disclosure, the "first user" includes, for example, a teacher for the topic of the remote dialogue. The "second user" includes, for example, a student as the interlocutor of the teacher. The "first audio data" includes data that is set to a higher volume when the content of the speech in the audio data of the user's speech is outputted as voice from another user's dialogue apparatus. The "second audio data" includes data that is set to a lower volume when the content of the speech in the audio data of the user's speech is outputted as voice from another user's dialogue apparatus.

The user interacts with other users by, for example, using a remote dialogue web application, installed on the user's own dialogue apparatus and linked to the information processing apparatus 10, while viewing the screen of the dialogue apparatus. For example, the screen of the first user's dialogue apparatus displays video of the plurality of second users. For example, the screen of the second user's dialogue apparatus displays video of the first user and video of the other second users. The user's dialogue apparatus transmits the content of the user's speech as audio data to other users' dialogue apparatuses via the information processing apparatus 10. The user's dialogue apparatus outputs the content of the speech by the other users as voice based on the audio data received from the other users' dialogue apparatuses.

The information processing apparatus 10 is a single server apparatus or a plurality of server apparatuses that can communicate with each other. The information processing apparatus 10 is not limited to these, and may be any general purpose electronic device such as a personal computer (PC) or a smartphone, or may be any other electronic device that is dedicated to the information processing system 1.

The first dialogue apparatus 20 is a general purpose electronic device such as a PC, a tablet PC, or a smartphone. The first dialogue apparatus 20 is an electronic device used by the first user. The first dialogue apparatus 20 is not limited to these examples and may be one server apparatus, or a plurality of server apparatuses that can communicate with each other, used by the first user. The first dialogue apparatus 20 may also be another dedicated electronic device for the information processing system 1.

The second dialogue apparatus 30 is a general purpose electronic device such as a PC, a tablet PC, or a smartphone. The second dialogue apparatus 30 is an electronic device used by the second user. The second dialogue apparatus 30 is not limited to these examples and may be one server apparatus, or a plurality of server apparatuses that can communicate with each other, used by the second user. The second dialogue apparatus 30 may also be another dedicated electronic device for the information processing system 1.

Figure 2:
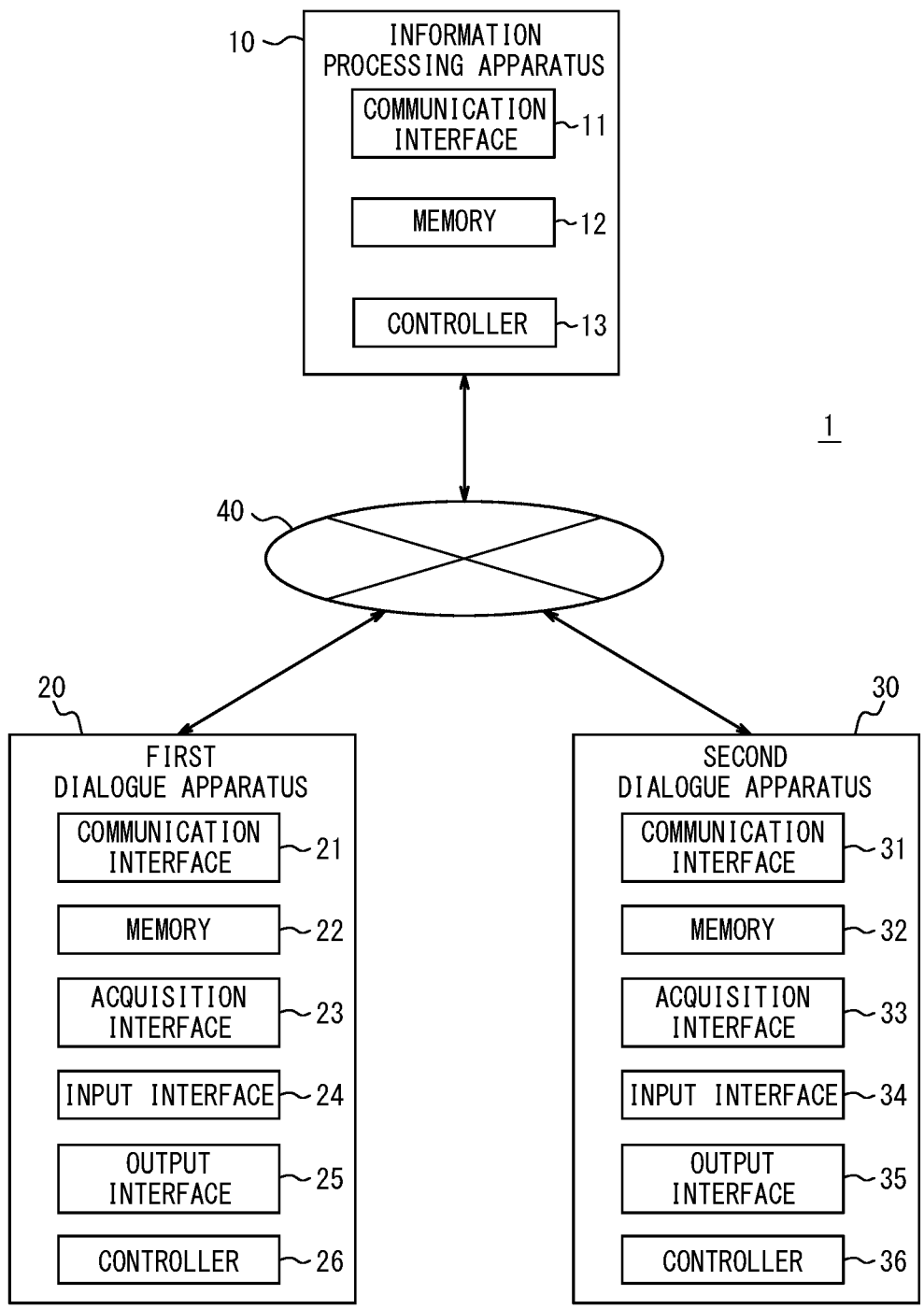
FIG. 2 is a functional block diagram illustrating a schematic configuration of each of the information processing apparatus, a first dialogue apparatus, and a second dialogue apparatus in FIG. 1.

FIG. 2 is a functional block diagram illustrating a schematic configuration of each of the information processing apparatus 10, the first dialogue apparatus 20, and the second dialogue apparatus 30 in FIG. 1. With reference to FIG. 2, example configurations of each of the information processing apparatus 10, the first dialogue apparatus 20, and the second dialogue apparatus 30 included in the information processing system 1 are primarily described.

As illustrated in FIG. 2, the information processing apparatus 10 includes a communication interface 11, a memory 12, and a controller 13.

The communication interface 11 includes a communication module connected to the network 40. For example, the communication interface 11 includes a communication module compliant with mobile communication standards such as the 4th generation (4G) and the 5th generation (5G) standards or with Internet standards. In an embodiment, the information processing apparatus 10 is connected to the network 40 via the communication interface 11. The communication interface 11 transmits and receives various information via the network 40.

The memory 12 is, for example, a semiconductor memory, a magnetic memory, an optical memory, or the like, but is not limited to these. The memory 12 functions as a main memory, an auxiliary memory, or a cache memory. The memory 12 stores any information used for operations of the information processing apparatus 10. The memory 12 stores a system program, an application program, and various information transmitted or received by the communication interface 11. The information stored in the memory 12 is updated with information received from the network 40 via the communication interface 11.

The controller 13 includes at least one processor. The "processor" is a general purpose processor or a dedicated processor that is dedicated to specific processing in an embodiment but is not limited to these. The controller 13 is connected to each component included in the information processing apparatus 10 so as to communicate with each component and controls operation of the entire information processing apparatus 10.

The configuration of the first dialogue apparatus 20 included in the information processing system 1 will be primarily described. As illustrated in FIG. 2, the first dialogue apparatus 20 includes a communication interface 21, a memory 22, an acquisition interface 23, an input interface 24, an output interface 25, and a controller 26.

The communication interface 21 includes a communication module connected to the network 40. For example, the communication interface 21 includes a communication module compliant with mobile communication standards such as the 4G and the 5G standards or Internet standards. In an embodiment, the first dialogue apparatus 20 is connected to the network 40 via the communication interface 21. The communication interface 21 transmits and receives various information via the network 40.

The memory 22 is, for example, a semiconductor memory, a magnetic memory, an optical memory, or the like, but is not limited to these. The memory 22 functions as, for example, a main memory, an auxiliary memory, or a cache memory. The memory 22 stores any information used for operations of the first dialogue apparatus 20. The memory 22 stores a system program, an application program, and various information transmitted or received by the communication interface 21. The information stored in the memory 22 is updated with information received from the network 40 via the communication interface 21.

The acquisition interface 23 includes any imaging apparatus capable of capturing images of the first user speaking or the like. For example, the acquisition interface 23 includes a webcam or the like. The acquisition interface 23 captures images of the first user participating in a remote dialogue using the first dialogue apparatus 20. The acquisition interface 23 continuously captures images of the first user while the remote dialogue is being carried out.

The input interface 24 includes at least one input interface for detecting user input to acquire input information based on an operation by a user. For example, the input interface 24 includes a physical key, a capacitive key, a touch screen integrally provided with a display of the output interface 25, or a microphone that receives audio input.

The output interface 25 includes at least one interface for outputting information to notify the user of the information. For example, the output interface 25 includes a display for outputting information as video, and a speaker, earphones, headphones, or the like for outputting information as audio.

The controller 26 includes at least one processor. The controller 26 is communicably connected to each component included in the first dialogue apparatus 20 and controls the operations of the entire first dialogue apparatus 20.

The configuration of the second dialogue apparatus 30 included in the information processing system 1 will be primarily described. As illustrated in FIG. 2, the second dialogue apparatus 30 includes a communication interface 31, a memory 32, an acquisition interface 33, an input interface 34, an output interface 35, and a controller 36.

The communication interface 31 includes a communication module connected to the network 40. For example, the communication interface 31 includes a communication module compliant with mobile communication standards such as the 4G and the 5G standards or Internet standards. In an embodiment, the second dialogue apparatus 30 is connected to the network 40 via the communication interface 31. The communication interface 31 transmits and receives various information via the network 40.

The memory 32 is, for example, a semiconductor memory, a magnetic memory, an optical memory, or the like, but is not limited to these. The memory 32 functions as, for example, a main memory, an auxiliary memory, or a cache memory. The memory 32 stores any information used for operations of the second dialogue apparatus 30. The memory 32 stores a system program, an application program, and various information transmitted or received by the communication interface 31. The information stored in the memory 32 is updated with information received from the network 40 via the communication interface 31.

The acquisition interface 33 includes any imaging apparatus capable of capturing images of the second user speaking or the like. For example, the acquisition interface 33 includes a webcam or the like. The acquisition interface 33 captures images of the second user participating in a remote dialogue using the second dialogue apparatus 30. The acquisition interface 33 continuously captures images of the second user while the remote dialogue is being carried out.

The input interface 34 includes at least one input interface for detecting user input to acquire input information based on an operation by a user. For example, the input interface 34 includes a physical key, a capacitive key, a touch screen integrally provided with a display of the output interface 35, or a microphone that receives audio input.

The output interface 35 includes at least one interface for outputting information to notify the user of the information. For example, the output interface 35 includes a display for outputting information as video, and a speaker, earphones, headphones, or the like for outputting information as audio.

The controller 36 includes at least one processor. The controller 36 is communicably connected to each component included in the second dialogue apparatus 30 and controls the operations of the entire second dialogue apparatus 30.

Figure 3:
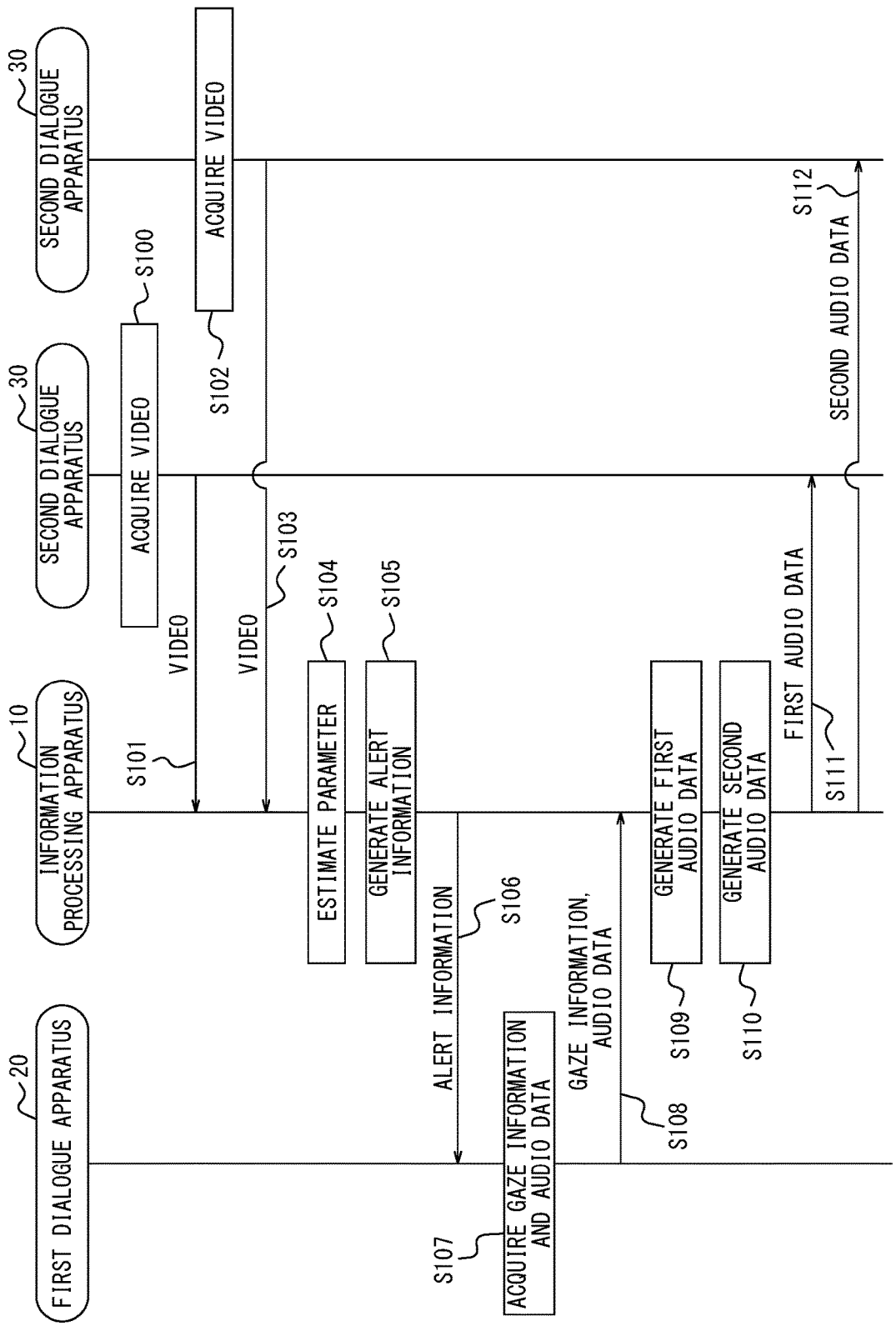
FIG. 3 is a sequence diagram illustrating a first example of an information processing method executed by the information processing system in FIG. 1.

FIG. 3 is a sequence diagram illustrating a first example of an information processing method executed by the information processing system of FIG. 1. With reference to FIG. 3, the first example of the information processing method performed by the information processing system 1 of FIG. will primarily be described. The sequence diagram illustrated in FIG. 3 mainly illustrates the basic process flow of the information processing method when the first user using the first dialogue apparatus 20 speaks to a second user using the second dialogue apparatus 30. Although only two second dialogue apparatuses 30 are depicted in FIG. 3 as an example, the number of second dialogue apparatuses 30 included in the information processing system may be three or more.

In step S100, the controller 36 of the second dialogue apparatus 30 used by one second user uses the imaging apparatus included in the acquisition interface 33 to acquire video of the one second user, who is participating in a remote dialogue. At this time, when the one second user speaks, the controller 36 acquires the content of the speech by the one second user as audio data, using the microphone included in the input interface 34, together with the video.

In step S101, the controller 36 of the second dialogue apparatus 30 used by the one second user transmits the video acquired in step S100 to the information processing apparatus 10 via the communication interface 31 and the network 40. At this time, the controller 36 transmits audio data based on the content of the speech by the one second user to the information processing apparatus 10 as necessary together with the video. The controller 13 of the information processing apparatus 10 receives the video acquired by the second dialogue apparatus 30 used by the one second user from the second dialogue apparatus 30 via the network 40 and the communication interface 11. At this time, the controller 36 receives audio data based on the content of the speech by the one second user from the second dialogue apparatus 30 as necessary together with the video.

In step S102, the controller 36 of the second dialogue apparatus 30 used by another second user uses the imaging apparatus included in the acquisition interface 33 to acquire video of the other second user, who is participating in the remote dialogue. At this time, when the other second user speaks, the controller 36 acquires the content of the speech by the other second user as audio data, using the microphone included in the input interface 34, together with the video.

In step S103, the controller 36 of the second dialogue apparatus 30 used by the other second user transmits the video acquired in step S102 to the information processing apparatus 10 via the communication interface 31 and the network 40. At this time, the controller 36 transmits audio data based on the content of the speech by the other second user to the information processing apparatus 10 as necessary together with the video. The controller of the information processing apparatus 10 receives the video acquired by the second dialogue apparatus 30 used by the other second user from the second dialogue apparatus 30 via the network 40 and the communication interface 11. At this time, the controller 13 receives audio data based on the content of the speech by the other second user from the second dialogue apparatus 30 as necessary together with the video.

The controller 13 of the information processing apparatus 10 transmits the video and audio data of the second users acquired in steps S101 and S103 to the first dialogue apparatus 20 via the communication interface 11 and the network 40. The controller 13 thereby controls the output interface 25 of the first dialogue apparatus 20 to output the video and audio data for the second users acquired in steps S101 and S103.

In step S104, the controller 13 of the information processing apparatus estimates the parameter of each interlocutor with respect to the topic of the remote dialogue based on the video of each interlocutor, i.e., the video of the second users acquired in steps S101 and S103, while the remote dialogue is in progress. In greater detail, the controller 13 estimates the parameter of the second users based on image analysis and other techniques on the facial expressions, gestures, and the like of the second user exhibited in the video. At this time, the controller 13 may estimate the parameter of the second users using a learning model constructed by learning the parameter according to the user's facial expressions, gestures, and the like based on learning data in which the user's facial expressions, gestures, and the like are associated with the parameter.

In step S105, the controller 13 of the information processing apparatus generates alert information about an alert indicating each interlocutor whose parameter estimated in step S104 is less than a threshold.

In step S106, the controller 13 of the information processing apparatus transmits the alert information generated in step S105 to the first dialogue apparatus 20 via the communication interface 11 and the network 40. The controller 26 of the first dialogue apparatus 20 receives the alert information, generated by the information processing apparatus 10, from the information processing apparatus 10 via the network 40 and the communication interface 21. The controller 13 of the information processing apparatus 10 thereby controls the first dialogue apparatus 20 of the first user to display the alert indicating each interlocutor whose parameter estimated in step S104 is less than a threshold. Based on the alert information acquired from the information processing apparatus 10, the controller 26 of the first dialogue apparatus 20 displays, on the output interface 25, the alert indicating each interlocutor whose parameter estimated in step S104 is less than a threshold.

In step S107, the controller 26 of the first dialogue apparatus 20 acquires, using the acquisition interface 23, gaze information for when the first user gazes at and speaks to an interlocutor displayed with the alert in step S106 among the plurality of interlocutors as second users displayed on the screen of the output interface 25 of the first dialogue apparatus 20. At this time, the controller 26 acquires the content of the speech by the first user as audio data, using the microphone included in the input interface 24, together with the gaze information.

In step S108, the controller 26 of the first dialogue apparatus 20 transmits the gaze information and audio data acquired in step S107 to the information processing apparatus 10 via the communication interface 21 and the network 40. The controller 13 of the information processing apparatus 10 receives the gaze information and the audio data acquired by the first dialogue apparatus 20 from the first dialogue apparatus 20 via the network 40 and the communication interface 11.

In step S109, the controller 13 of the information processing apparatus determines, based on the gaze information acquired in step S108, that the first user gazed at and spoke to an interlocutor displayed with the alert in step S106 among the plurality of interlocutors as second users displayed on the screen of the first dialogue apparatus 20. Upon making this determination, the controller 13 generates first audio data, based on the audio data acquired in step S108, for outputting the content of speech by the first user to the interlocutor in question with a high volume on the second dialogue apparatus of the interlocutor.

In step S110, in accordance with the determination process in step S109, the controller 13 of the information processing apparatus 10 generates second audio data, based on the audio data acquired in step S108, for outputting the content of speech by the first user to the interlocutor with a low volume on the second dialogue apparatus 30 of the interlocutors other than the interlocutor in question.

In step S111, the controller 13 of the information processing apparatus transmits the first audio data with a high volume, generated in step S109, to the second dialogue apparatus 30 of the aforementioned interlocutor. In greater detail, the controller 13 transmits the first audio data generated in step S109 via the communication interface 11 and the network 40 to the second dialogue apparatus 30 of the second user as the interlocutor, who the first user gazed at and spoke to, displayed with the alert in step S106. The controller 36 of the second dialogue apparatus 30 receives the first audio data, generated by the information processing apparatus 10, from the information processing apparatus 10 via the network 40 and the communication interface 31.

In this way, when the first user gazes at and speaks to an interlocutor displayed with the alert in step S106, among a plurality of interlocutors as second users displayed on the screen of the first dialogue apparatus 20, the controller 13 of the information processing apparatus 10 transmits the first audio data with a high volume to the second dialogue apparatus 30 of the interlocutor. The controller 36 of the second dialogue apparatus 30 outputs the content of speech by the first user with a high volume, based on the acquired first audio data, to the second user from the speaker or the like of the output interface 35.

In step S112, the controller 13 of the information processing apparatus transmits the second audio data with a low volume, generated in step S110, to the second dialogue apparatus 30 of interlocutors other than the aforementioned interlocutor. In greater detail, the controller 13 transmits the second audio data generated in step S110 to the second dialogue apparatus 30 of the second users as interlocutors other than the aforementioned interlocutor, who the first user gazed at and spoke to, via the communication interface 11 and the network 40. The controller 36 of the second dialogue apparatus 30 receives the second audio data, generated by the information processing apparatus 10, from the information processing apparatus 10 via the network and the communication interface 31.

In this way, the controller 13 of the information processing apparatus transmits the second audio data with a low volume to the second dialogue apparatus 30 of the interlocutors other than the interlocutor, displayed with the alert in step S106, who the first user gazed at and spoke to among a plurality of interlocutors as second users displayed on the screen of the first dialogue apparatus 20. The controller 36 of the second dialogue apparatus 30 outputs the content of speech by the first user with a low volume, based on the acquired second audio data, to the second user from the speaker or the like of the output interface 35.

Figure 4:
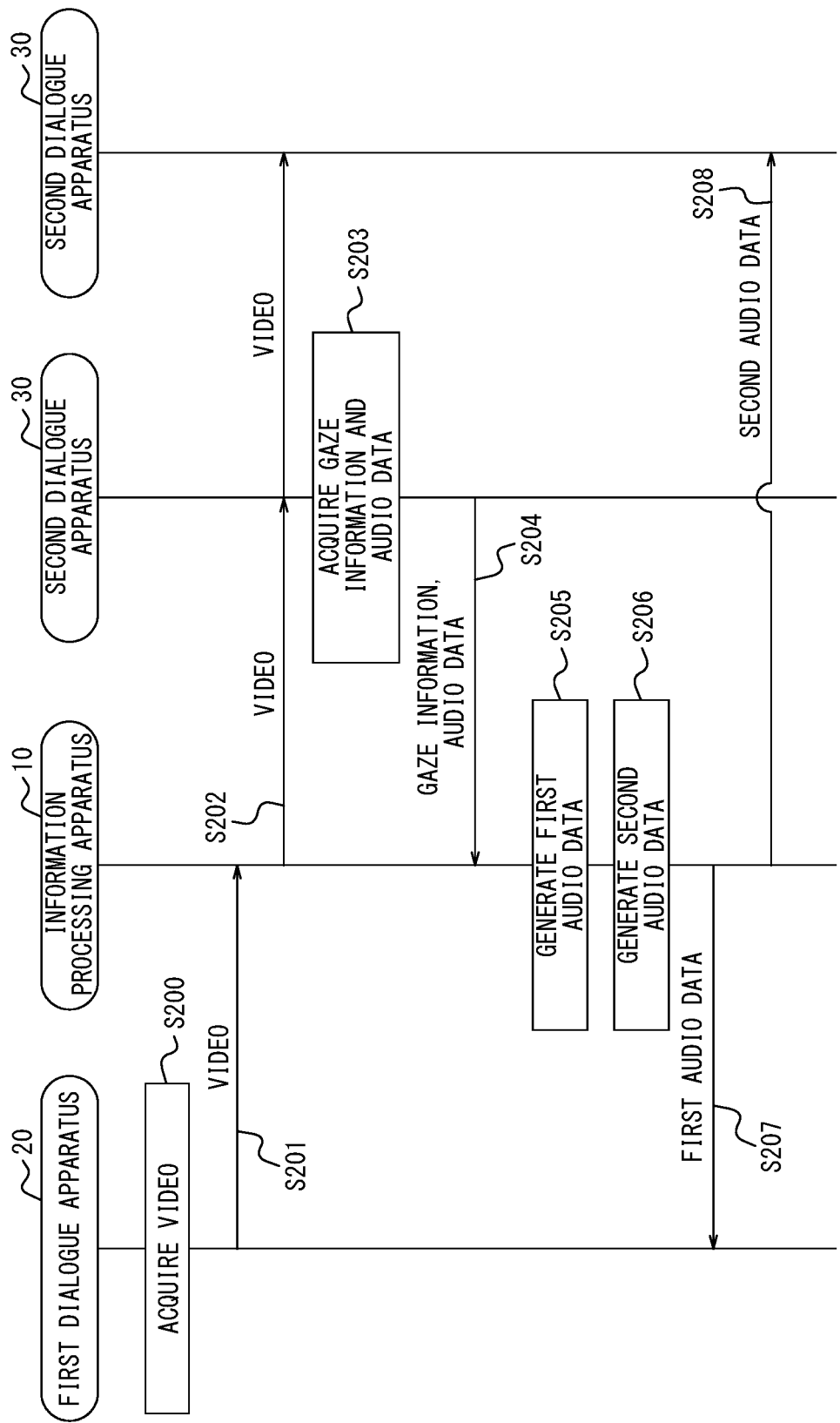
FIG. 4 is a sequence diagram illustrating a second example of an information processing method executed by the information processing system in FIG. 1.

FIG. 4 is a sequence diagram illustrating a second example of an information processing method executed by the information processing system of FIG. 1. With reference to FIG. 4, the second example of the information processing method performed by the information processing system 1 of FIG. will primarily be described. The sequence diagram illustrated in FIG. 4 mainly illustrates the basic process flow of the information processing method when a second user using the second dialogue apparatus 30 speaks to the first user using the first dialogue apparatus 20. Although only two second dialogue apparatuses 30 are depicted in FIG. 4 as an example, the number of second dialogue apparatuses 30 included in the information processing system 1 may be three or more.

In step S200, the controller 26 of the first dialogue apparatus 20 used by the first user uses the imaging apparatus included in the acquisition interface 23 to acquire video of the first user, who is participating in the remote dialogue. At this time, when the first user speaks, the controller 26 acquires the content of the speech by the first user as audio data, using the microphone included in the input interface 24, together with the video.

In step S201, the controller 26 of the first dialogue apparatus 20 used by the first user transmits the video acquired in step S200 to the information processing apparatus 10 via the communication interface 21 and the network 40. At this time, the controller 26 transmits audio data based on the content of the speech by the first user to the information processing apparatus 10 as necessary together with the video. The controller 13 of the information processing apparatus 10 receives the video acquired by the first dialogue apparatus 20 used by the first user from the first dialogue apparatus 20 via the network 40 and the communication interface 11. At this time, the controller 13 receives audio data based on the content of the speech by the first user from the first dialogue apparatus 20 as necessary together with the video.

In step S202, the controller 13 of the information processing apparatus transmits the video and audio data of the first user acquired in step S201 to the plurality of second dialogue apparatuses 30 via the communication interface 11 and the network 40. The controller 13 thereby controls the output interface 35 of each of the second dialogue apparatuses 30 to output the video and audio data for the first user acquired in step S201.

In step S203, the controller 36 of the second dialogue apparatus 30 acquires, using the acquisition interface 33, gaze information for when the second user gazes at and speaks to the first user displayed on the screen of the output interface 35 of the second dialogue apparatus 30. At this time, the controller 36 acquires the content of the speech by the second user as audio data, using the microphone included in the input interface 34, together with the gaze information.

In step S204, the controller 36 of the second dialogue apparatus 30 transmits the gaze information and audio data acquired in step S203 to the information processing apparatus 10 via the communication interface 31 and the network 40. The controller 13 of the information processing apparatus 10 receives the gaze information and the audio data acquired by the second dialogue apparatus 30 from the second dialogue apparatus 30 via the network and the communication interface 11.

In step S205, the controller 13 of the information processing apparatus determines, based on the gaze information acquired in step S204, that the second user gazed at and spoke to the first user displayed on the screen of the second dialogue apparatus 30. Upon making this determination, the controller generates first audio data, based on the audio data acquired in step S204, for outputting the content of speech to the first user, who corresponds to the interlocutor of the second user, with a high volume on the first dialogue apparatus 20 of the first user.

In step S206, in accordance with the determination process in step S205, the controller 13 of the information processing apparatus 10 generates second audio data, based on the audio data acquired in step S204, for outputting the content of speech spoken to the first user, who corresponds to the interlocutor of the second user, with a low volume on the second dialogue apparatus 30 of the interlocutors other than the first user.

In step S207, the controller 13 of the information processing apparatus transmits the first audio data with a high volume, generated in step S205, to the first dialogue apparatus 20 of the first user as the aforementioned interlocutor. In greater detail, the controller 13 transmits the first audio data generated in step S205 to the first dialogue apparatus 20 of the first user as the interlocutor, who the second user gazed at and spoke to, via the communication interface 11 and the network 40. The controller 26 of the first dialogue apparatus 20 receives the first audio data, generated by the information processing apparatus 10, from the information processing apparatus 10 via the network 40 and the communication interface 21.

In this way, when the second user gazes at and speaks to the first user displayed on the screen of the second dialogue apparatus 30, the controller 13 of the information processing apparatus 10 transmits the first audio data with a high volume to the first dialogue apparatus 20 of the first user. The controller 26 of the first dialogue apparatus 20 outputs the content of speech by the second user with a high volume, based on the acquired first audio data, to the first user from the speaker or the like of the output interface 25.

In step S208, the controller 13 of the information processing apparatus transmits the second audio data with a low volume, generated in step S206, to the second dialogue apparatus 30 of the users other than the first user as the aforementioned interlocutor and the second user who spoke. In greater detail, the controller 13 transmits the second audio data generated in step S206 to the second dialogue apparatus 30 of the users other than the first user as the aforementioned interlocutor, who the second user gazed at and spoke to, and the second user who spoke, via the communication interface 11 and the network 40. The controller 36 of the second dialogue apparatus 30 receives the second audio data, generated by the information processing apparatus 10, from the information processing apparatus 10 via the network 40 and the communication interface 31.

In this way, when the second user gazes at and speaks to the first user displayed on the screen of the second dialogue apparatus 30, the controller 13 of the information processing apparatus 10 transmits the second audio data with a low volume to the second dialogue apparatus 30 of the users other than the first user and the second user who spoke. The controller 36 of the second dialogue apparatus 30 outputs the content of speech by the second user with a low volume, based on the acquired second audio data, to the second user from the speaker or the like of the output interface 35.

Figure 5:
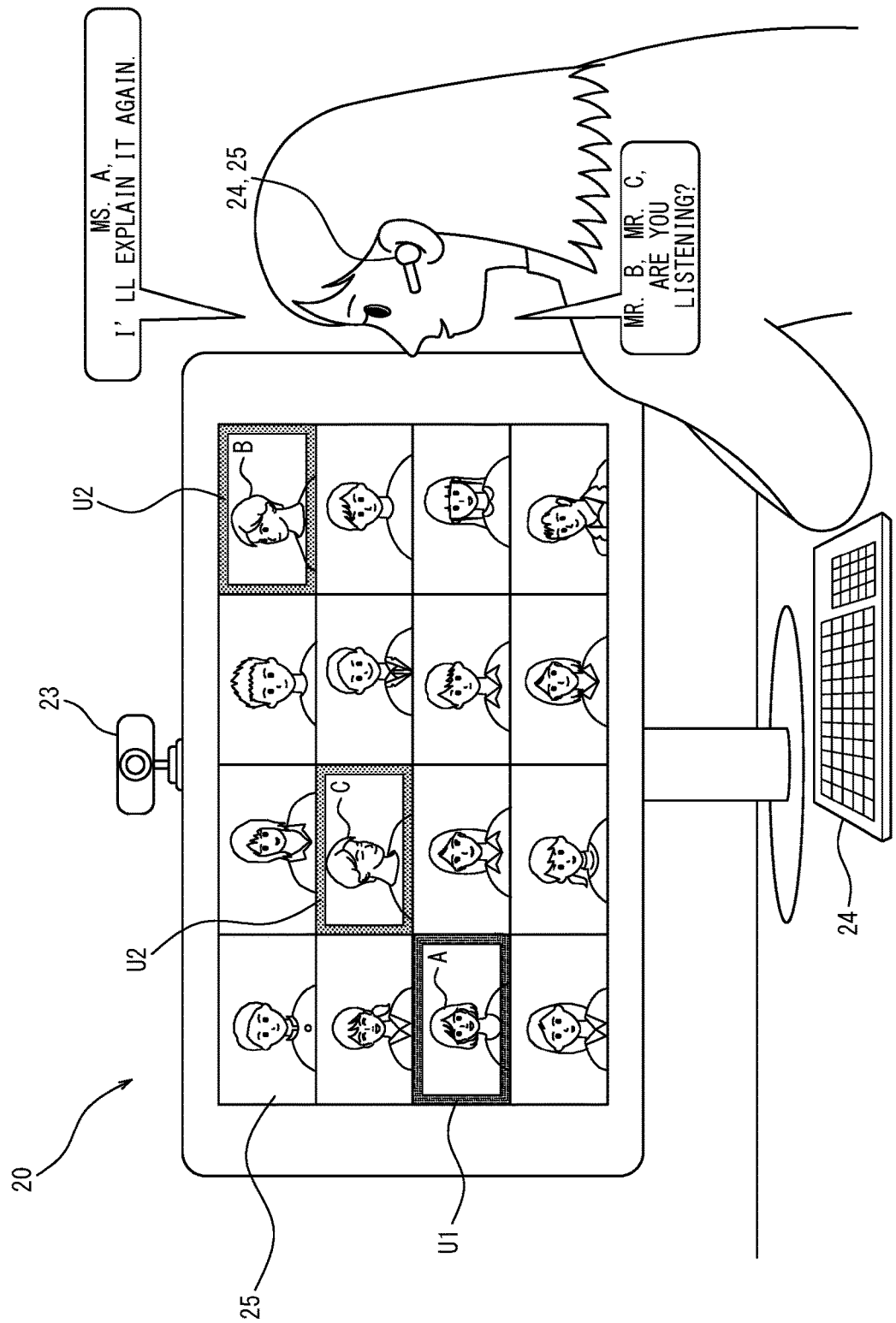
FIG. 5 is a schematic diagram illustrating an example of video displayed on the screen of an output interface of the first dialogue apparatus of a first user.

FIG. 5 is a schematic diagram illustrating an example of video displayed on the screen of the output interface 25 of the first dialogue apparatus 20 of the first user.

The controller 26 of the first dialogue apparatus 20 uses the output interface 25 to output the video and the audio data of the second user, acquired using the second dialogue apparatus 30. More specifically, the controller 26 displays the video of a plurality of second users on the screen of the output interface 25. The controller 26 outputs the audio of the plurality of second users through the earphones of the output interface 25.

At this time, based on the alert information acquired from the information processing apparatus 10, the controller 26 displays, on the screen of the output interface 25, the alert indicating each interlocutor whose estimated parameter is less than a threshold. In greater detail, the controller of the information processing apparatus 10 displays the alert by highlighting the interlocutor displayed on the screen of the output interface 25 in the first dialogue apparatus 20 of the first user.

For example, the controller 26 displays a first alert U1, indicating a second user A whose estimated level of comprehension is below a threshold, on the screen of the output interface 25. The controller 26 displays the first alert U1 by highlighting the second user A with a frame around the second user A displayed on the screen of the output interface 25.

For example, the controller 26 displays a second alert U2, indicating a second user B and a second user C whose estimated level of interest is below a threshold, on the screen of the output interface 25. The controller 26 displays the second alert U2 by highlighting each of the second user B and the second user C displayed on the screen of the output interface 25 with a different frame around each of the second user B and the second user C than the frame for the first alert U1.

The controller 26 acquires, using the acquisition interface 23, gaze information for when the first user gazes at and speaks to the second user A, for whom the first alert U1 is displayed on the screen of the output interface 25. At this time, the controller 26 acquires the content of the speech by the first user as audio data, using the microphone included in the input interface 24, together with the gaze information.

The controller 36 of the second dialogue apparatus 30 of the second user A outputs the content of speech by the first user with a high volume, based on the first audio data generated by and acquired from the information processing apparatus 10, to the second user A from the speaker or the like of the output interface 35. The controller 36 of the second dialogue apparatus 30 of the second users other than the second user A outputs the content of speech by the first user with a low volume, based on the second audio data generated by and acquired from the information processing apparatus 10, to the second users from the speaker or the like of the output interface 35.

The controller 26 acquires, using the acquisition interface 23, gaze information for when the first user gazes at and speaks to the second user B, for whom the second alert U2 is displayed on the screen of the output interface 25. At this time, the controller 26 acquires the content of the speech by the first user as audio data, using the microphone included in the input interface 24, together with the gaze information.

The controller 36 of the second dialogue apparatus 30 of the second user B outputs the content of speech by the first user with a high volume, based on the first audio data generated by and acquired from the information processing apparatus 10, to the second user B from the speaker or the like of the output interface 35. The controller 36 of the second dialogue apparatus 30 of the second users other than the second user B outputs the content of speech by the first user with a low volume, based on the second audio data generated by and acquired from the information processing apparatus 10, to the second users from the speaker or the like of the output interface 35.

The above processing in the information processing system 1 applies equally to the second user C for whom the second alert U2 is displayed on the screen of the output interface 25.

FIG. 6 is a schematic diagram illustrating an example of video displayed on the screen of the output interface 35 in the second dialogue apparatus 30 of the second user.

The controller 36 of the second dialogue apparatus 30 uses the output interface 35 to output the video and the audio data of the first user as acquired using the first dialogue apparatus 20. More specifically, the controller 36 displays the video of the first user on the screen of the output interface 35. The controller 36 outputs the audio of the first user through the earphones of the output interface 35.

The controller 36 of the second dialogue apparatus 30 uses the output interface 35 to output the video and the audio data of the other second users as acquired using the other second dialogue apparatuses 30. More specifically, the controller 36 displays the video of a plurality of other second users on the screen of the output interface 35. The controller 36 outputs the audio of the plurality of other second users through the earphones of the output interface 35.

The controller 36 acquires, using the acquisition interface 33, gaze information for when the second user gazes at and speaks to the first user D displayed on the screen of the output interface 35. At this time, the controller acquires the content of the speech by the second user as audio data, using the microphone included in the input interface 34, together with the gaze information.

The controller 26 in the first dialogue apparatus 20 of the first user D outputs the content of speech by the second user with a high volume, based on the first audio data generated by and acquired from the information processing apparatus 10, to the first user D from the speaker or the like of the output interface 25. The controller 36 in the second dialogue apparatus 30 of the second users other than the first user D and the second user who spoke outputs the content of speech by the second user with a low volume, based on the second audio data generated by and acquired from the information processing apparatus 10, to the second users from the speaker or the like of the output interface 35.

According to the above embodiment, the convenience of a dialogue service using a dialogue apparatus used by each of a plurality of users located remotely from each other is improved. The information processing apparatus displays an alert, on the first dialogue apparatus 20 of the first user, indicating each interlocutor whose estimated parameter is less than a threshold. This enables the first user to see each interlocutor who has a low parameter with respect to the topic in the remote dialogue. Accordingly, the first user can, for example, provide a more detailed explanation to an interlocutor with a low level of comprehension of the topic in order to improve that interlocutor's level of comprehension. The first user can, for example, follow up appropriately with an interlocutor who has a low level of interest or concentration with respect to the topic in order to increase the interlocutor's awareness of the topic.

The information processing apparatus 10 transmits the first audio data with a high volume to the second dialogue apparatus 30 of the interlocutor for whom the alert is displayed, and who is gazed at and spoken to by the first user. On the other hand, the information processing apparatus 10 transmits the second audio data with a low volume to the second dialogue apparatuses 30 of interlocutors other than the interlocutor in question. As described above, the first user's speech is outputted at a relatively high volume on the second dialogue apparatus 30 of the interlocutor who is the focus of the first user's attention, whereas the first user's speech is outputted at a relatively low volume on the second dialogue apparatuses 30 of the interlocutors who are not the focus of attention. Therefore, in a case in which the first user is a teacher, for example, the first user can selectively call on interlocutors with a low parameter.

Upon the second user gazing at and speaking to the first user, the information processing apparatus 10 transmits the first audio data with a high volume to the first dialogue apparatus 20 of the first user. The information processing apparatus 10 transmits the second audio data with a low volume to the second dialogue apparatus 30 of users other than the first user and the second user who spoke. As described above, the second user's speech is outputted at a relatively high volume on the first dialogue apparatus 20 of the first user who is the focus of the second user's attention, whereas the second user's speech is outputted at a relatively low volume on the second dialogue apparatuses 30 of the interlocutors who are not the focus of attention. Therefore, in a case in which the second user is a student, for example, the second user can ask a question while focusing on the teacher on the screen of the second user's own second dialogue apparatus 30 and make it difficult for other students to overhear the question. The information processing apparatus can thereby actively encourage the second user to ask questions.

By the first user including a teacher for the topic of the remote dialogue and the second users including students as interlocutors with the teacher, the information processing system 1 can be utilized for one-to-many online teaching services.

The information processing apparatus 10 displays the alert by highlighting the interlocutor displayed on the screen of the first dialogue apparatus 20 of the first user. This improves the visibility of an alert indicating a predetermined second user. The first user can easily recognize a predetermined second user for whom the alert is displayed on the screen of the first user's own first dialogue apparatus 20.

By including at least one of each interlocutor's level of comprehension, level of interest, and level of concentration with respect to the topic of the remote dialogue, the information processing apparatus 10 can identify a predetermined second user who is below a threshold based on at least one of the level of comprehension, level of interest, and level of concentration.

While the present disclosure has been described based on the drawings and examples, it should be noted that various changes and modifications can be made by those skilled in the art based on the present disclosure. Accordingly, such modifications and revisions are included within the scope of the present disclosure. For example, functions or the like included in each configuration, each step, or the like can be rearranged without logical inconsistency, and a plurality of configurations, steps, or the like can be combined into one or divided.

For example, at least some of the processing operations executed on the information processing apparatus 10 in the above-described embodiment may be executed on the first dialogue apparatus 20 or the second dialogue apparatus 30. For example, instead of the information processing apparatus 10, the first dialogue apparatus 20 or the second dialogue apparatus 30 itself may execute the sequence of processing operations described above with regard to the information processing apparatus 10. At least some of the processing operations executed on the first dialogue apparatus 20 or the second dialogue apparatus 30 may be executed on the information processing apparatus 10.

For example, a configuration that causes a general purpose electronic device such as a smartphone, a computer, or the like to function as the information processing apparatus 10 according to the above embodiment is possible. Specifically, a program in which processes for realizing the functions of the information processing apparatus 10 or the like according to the embodiment are written may be stored in a memory of the electronic device, and the program may be read and executed by a processor of the electronic device. Accordingly, in an embodiment, the present disclosure can also be implemented as a program executable by a processor.

Alternatively, an embodiment of the disclosure can also be implemented as a non-transitory computer readable medium storing a program executable by a single processor or a plurality of processors to cause the information processing apparatus 10 or the like according to the embodiment to execute the functions. It is to be understood that these are also included within the scope of the present disclosure.

In the above embodiment, the information processing apparatus 10 is described as transmitting first audio data to the first dialogue apparatus 20 when the second user gazes at and speaks to the first user and transmitting second audio data to the second dialogue apparatuses 30 of users other than the first user and the second user who spoke, but this configuration is not limiting. The information processing apparatus 10 need not execute such processing. In other words, even when the second user gazes at and speaks to the first user, the information processing system 1 may output the second user's voice at the same volume to the dialogue apparatuses of users other than the second user who spoke.

In the above embodiment, the first user has been described as including a teacher for the topic of the remote dialogue, but this configuration is not limiting. The first user may include a student as an interlocutor of the teacher, or any other user with a relationship other than a teacher-student relationship. For example, the first user may include a user participating online in any meeting, such as a business meeting.

In the above embodiment, the information processing system 1 has been described as being used by one first user and as including only one first dialogue apparatus 20, but this configuration is not limiting. A plurality of first users may use the information processing system 1, and the information processing system 1 may include a plurality of first dialogue apparatuses 20.

In the above embodiment, the second user has been described as including a student as the interlocutor of the teacher, but this configuration is not limiting. The second user may include a teacher for the topic of the remote dialogue, or any other user with a relationship other than a teacher-student relationship. For example, the second user may include a user participating online in any meeting, such as a business meeting.

In the above embodiment, the information processing system 1 has been described as being used by a plurality of second users and as including a plurality of second dialogue apparatuses 30, but this configuration is not limiting. One second user may use the information processing system 1, and the information processing system 1 may include only one second dialogue apparatus 30.

In the above embodiment, the information processing system 1 has been described as being utilized for online class services with a plurality of students for one teacher, but this configuration is not limiting. The information processing system 1 may be utilized for online teaching services with one student for one teacher, or online teaching services with one or more students for a plurality of teachers. Additionally, the information processing system 1 may be utilized in one-to-one, one-to-many, many-to-one, or many-to-many online conferencing services for the first user(s) and the second user(s).

In the above embodiment, the information processing apparatus 10 has been described as displaying an alert by highlighting the interlocutor displayed on the screen of the first dialogue apparatus 20 of the first user, but this configuration is not limiting. The information processing apparatus 10 may display the alert by using any display method other than highlighting to display the interlocutor displayed on the screen of the first dialogue apparatus of the first user.

In the above embodiment, the parameters have been described as including at least one of the level of comprehension, level of interest, and level of concentration of each interlocutor with respect to the topic of the remote dialogue, but this configuration is not limiting. The parameters may include any other indicators that can objectively capture the state of each interlocutor with respect to the topic of the remote dialogue as a numerical value.

Examples of some embodiments of the present disclosure are described below. However, it should be noted that the embodiments of the present disclosure are not limited to these examples.

[Appendix 1] An information processing apparatus for supporting a dialogue using a dialogue apparatus used by each of a plurality of users located remotely from each other, the information processing apparatus comprising a controller configured to:
  estimate, during execution of a remote dialogue, a parameter of each interlocutor with respect to a topic of the remote dialogue based on a video of each interlocutor, display an alert, on the dialogue apparatus of a first user, indicating each interlocutor whose estimated parameter is less than a threshold, and when the first user gazes at and speaks to an interlocutor displayed with the alert among a plurality of interlocutors as second users displayed on a screen of the dialogue apparatus, transmit first audio data with a high volume to the dialogue apparatus of the interlocutor and transmit second audio data with a low volume to the dialogue apparatus of interlocutors other than the interlocutor.

[Appendix 2] The information processing apparatus according to appendix 1, wherein when a second user gazes at and speaks to the first user, the controller is configured to transmit the first audio data to the dialogue apparatus of the first user and transmit the second audio data to the dialogue apparatus of the users other than the first user and the second user who spoke.

[Appendix 3] The information processing apparatus according to appendix 1 or 2, wherein
  the first user includes a teacher for the topic of the remote dialogue, and
  the second users include students as the interlocutor of the teacher.

[Appendix 4] The information processing apparatus according to any one of appendices 1 to 3, wherein the controller is configured to display the alert by highlighting the interlocutor displayed on the screen of the dialogue apparatus of the first user.

[Appendix 5] The information processing apparatus according to any one of appendices 1 to 4, wherein the parameter includes at least one of a level of comprehension, a level of interest, and a level of concentration of each interlocutor with respect to the topic of the remote dialogue.

[Appendix 6] An information processing system comprising:
  the information processing apparatus according to any one of appendices 1 to 5; and
  the dialogue apparatus used by each of the plurality of users.

[Appendix 7] A program configured to cause an information processing apparatus for supporting a dialogue using a dialogue apparatus used by each of a plurality of users located remotely from each other to execute operations, the operations comprising:
  estimating, during execution of a remote dialogue, a parameter of each interlocutor with respect to a topic of the remote dialogue based on a video of each interlocutor, displaying an alert, on the dialogue apparatus of a first user, indicating each interlocutor whose estimated parameter is less than a threshold, and when the first user gazes at and speaks to an interlocutor displayed with the alert among a plurality of interlocutors as second users displayed on a screen of the dialogue apparatus, transmitting first audio data with a high volume to the dialogue apparatus of the interlocutor and transmitting second audio data with a low volume to the dialogue apparatus of interlocutors other than the interlocutor.

[Appendix 8] An information processing method for supporting a dialogue using a dialogue apparatus used by each of a plurality of users located remotely from each other, the information processing method comprising:

estimating, during execution of a remote dialogue, a parameter of each interlocutor with respect to a topic of the remote dialogue based on a video of each interlocutor, displaying an alert, on the dialogue apparatus of a first user, indicating each interlocutor whose estimated parameter is less than a threshold, and when the first user gazes at and speaks to an interlocutor displayed with the alert among a plurality of interlocutors as second users displayed on a screen of the dialogue apparatus, transmitting first audio data with a high volume to the dialogue apparatus of the interlocutor and transmitting second audio data with a low volume to the dialogue apparatus of interlocutors other than the interlocutor.

The invention claimed is:

1. An information processing apparatus for supporting a dialogue using a dialogue apparatus used by each of a plurality of users located remotely from each other, the information processing apparatus comprising a controller configured to:

estimate, during execution of a remote dialogue, a parameter of each interlocutor with respect to a topic of the remote dialogue based on a video of each interlocutor, display an alert, on the dialogue apparatus of a first user, indicating each interlocutor whose estimated parameter is less than a threshold, and when the first user gazes at and speaks to an interlocutor displayed with the alert among a plurality of interlocutors as second users displayed on a screen of the dialogue apparatus, transmit first audio data with a high volume to the dialogue apparatus of the interlocutor and transmit second audio data with a low volume to the dialogue apparatuses of interlocutors other than the interlocutor, wherein when a second user gazes at and speaks to the first user, the controller is configured to transmit the first audio data to the dialogue apparatus of the first user and transmit the second audio data to the dialogue apparatuses of the users other than the first user and the second user who spoke.

2. The information processing apparatus according to claim 1, wherein the first user includes a teacher for the topic of the remote dialogue, and the second users include students as the interlocutors of the teacher.

3. The information processing apparatus according to claim 1, wherein the controller is configured to display the alert by highlighting the interlocutor displayed on the screen of the dialogue apparatus of the first user.

4. The information processing apparatus according to claim 1, wherein the parameter includes at least one of a level of comprehension, a level of interest, and a level of concentration of each interlocutor with respect to the topic of the remote dialogue.

5. An information processing system comprising:
the information processing apparatus according to claim 1; and
the dialogue apparatus used by each of the plurality of users.

6. A non-transitory computer readable medium having stored thereon a program configured to cause an information processing apparatus for supporting a dialogue using a dialogue apparatus used by each of a plurality of users located remotely from each other to execute operations, the operations comprising:

estimating, during execution of a remote dialogue, a parameter of each interlocutor with respect to a topic of the remote dialogue based on a video of each interlocutor, displaying an alert, on the dialogue apparatus of a first user, indicating each interlocutor whose estimated parameter is less than a threshold, when the first user gazes at and speaks to an interlocutor displayed with the alert among a plurality of interlocutors as second users displayed on a screen of the dialogue apparatus, transmitting first audio data with a high volume to the dialogue apparatus of the interlocutor and transmitting second audio data with a low volume to the dialogue apparatuses of interlocutors other than the interlocutor, and when a second user gazes at and speaks to the first user, transmitting the first audio data to the dialogue apparatus of the first user and transmitting the second audio data to the dialogue apparatuses of the users other than the first user and the second user who spoke.

7. An information processing method for supporting a dialogue using a dialogue apparatus used by each of a plurality of users located remotely from each other, the information processing method comprising:

estimating, during execution of a remote dialogue, a parameter of each interlocutor with respect to a topic of the remote dialogue based on a video of each interlocutor, displaying an alert, on the dialogue apparatus of a first user, indicating each interlocutor whose estimated parameter is less than a threshold, when the first user gazes at and speaks to an interlocutor displayed with the alert among a plurality of interlocutors as second users displayed on a screen of the dialogue apparatus, transmitting first audio data with a high volume to the dialogue apparatus of the interlocutor and transmitting second audio data with a low volume to the dialogue apparatuses of interlocutors other than the interlocutor, and when a second user gazes at and speaks to the first user, transmitting the first audio data to the dialogue apparatus of the first user and transmitting the second audio data to the dialogue apparatuses of the users other than the first user and the second user who spoke.

* * * * *